Jan. 2, 1968     G. JANSEN     3,361,460

CLAMP NUT

Filed May 2, 1966

INVENTOR.
GERHARD JANSEN
BY *M. Ralph Shaffer*
HIS ATTORNEY

United States Patent Office 3,361,460
Patented Jan. 2, 1968

3,361,460
CLAMP NUT
Gerhart Jansen, 73 Elizabeth St.,
Salt Lake City, Utah 84102
Filed May 2, 1966, Ser. No. 546,964
2 Claims. (Cl. 287—126)

ABSTRACT OF THE DISCLOSURE

This invention is a plural-jawed clamp for gripping elongated objects such as rods. Tightening of the clamp is effected by a nut which engages radially extending "feet" of the internal jaws. A ring member also encircles and engages the feet of the jaws. Upward movement of the ring member after release or removal of the clamping nut affords a quick release of the jaws from a member being held thereby.

---

The present invention relates to devices, referred to as "clamp nuts," for gripping shafts and other elongate members and, more particularly, to a new and improved shaft-gripping device which has a unique release mechanism.

Shaft-gripping devices, collets, and similar devices are, of course, not new. Many devices have been engineered for gripping shafts, studs, and other elongate objects. Frequently these will take the form of plural jaw elements which are urged together in a wedging construction to grip the object in question. There is, of course, the problem of releasing the jaw elements from the object gripped once it is desired to do so. It is the present invention which provides a means for this purpose.

Accordingly, a principal object of the present invention is to provide a device for gripping a shaft, stud or other elongate object and, additionally, which likewise is provided with a means in the form of a quick-release for immediately disengaging the jaw elements of the device from the object gripped.

A further object of the present invention is to provide novel jaw elements in gripping devices which are permanently retained therein at all times until the release nut of the device is removed therefrom.

A further object of the invention is to provide for the protrusion of jaw devices through the wall of the body with which it coacts, this to selectively actuate and thereby release the jaw elements from the device which they are gripping.

An additional object is to provide a quick-release means in a jaw-gripping device.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 4:
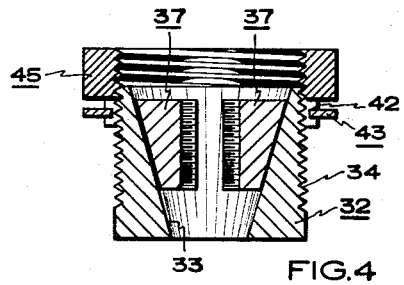
FIGURE 4 is a vertical section, in reduced scale, of an assembly of the device of FIGURE 3.

In the drawings two embodiments of the invention, a novel clamp nut, are disclosed. The first embodiment is depicted in FIGURES 1 and 2, and the second embodiment is seen in FIGURES 3 and 4.

Figure 2:
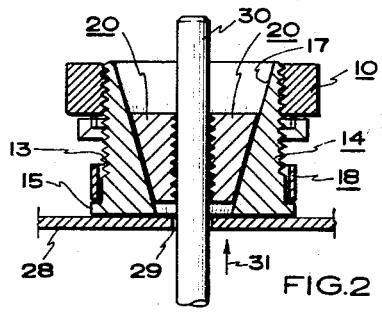
FIGURE 2 is a vertical section in reduced scale of the device of FIGURE 1, with the parts of the same being assembled together and disposed on an object to be gripped such as a shaft.
Figure 1:
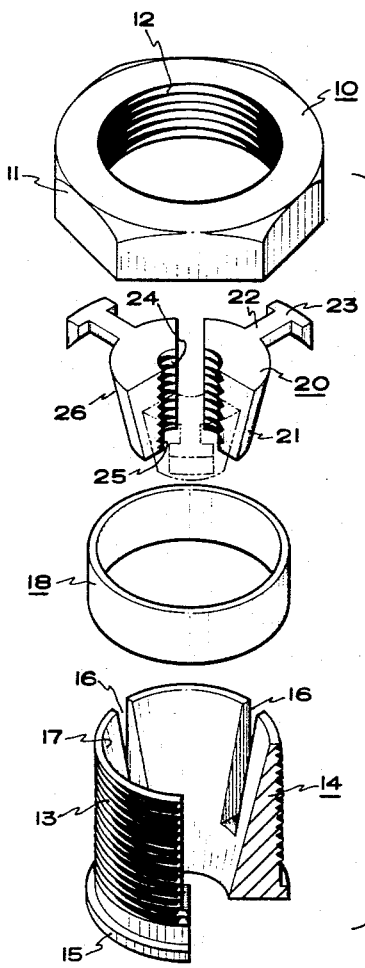
FIGURE 1 is an exploded perspective view of the device of the present invention; for convenience of illustration, a portion of the body of the device is broken away for clarity.
Figure 3:
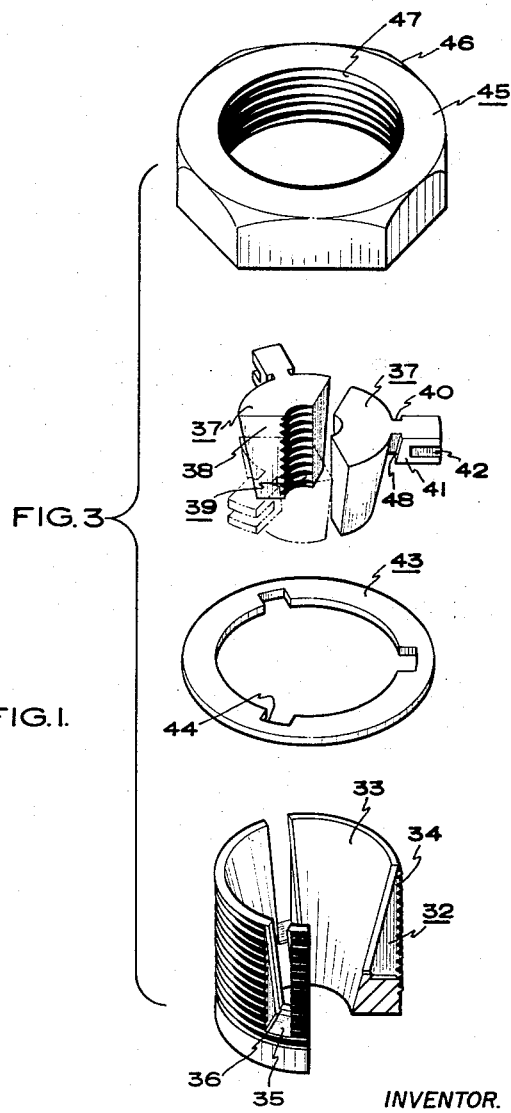
FIGURE 3 is an exploded perspective of a clamp nut representing a second embodiment of the invention.

In the embodiment of FIGURES 1 and 2 there is shown a control nut 10 having a conventional, hexagonal exterior periphery 11 and also interior threads 12. This nut, and particularly threads 12 thereof, cooperate with the exterior threads 13 of body 14. Body 14 includes at one extremity thereof an annular stop shoulder 15 as seen in FIGURE 1. Body 14 additionally includes a plurality of mutually, periphally-spaced guide slots 16 communicating from the exterior of body 14 to the progressively-constructing interior 17 thereof.

Release sleeve 18 is also provided and slips over body 14 to act in a manner hereinafter described. Annular stop shoulder 15 provides a stop abutment for the release sleeve 18.

Lastly, there are included a plural number of wedge jaw elements 20. Two of the jaw elements are shown in FIGURE 1 in their full view and the third jaw element in fragmentary view. Of course, two, three, or more jaw elements may be employed in any particular construction and the jaw element width determined in accordance with the number of jaw elements used. The wedge jaw elements 20 each include wedge jaw portions 21, extension guide 22, and foot 23 contiguous and integral with guide 22. See FIGURE 1 in this regard. The guide slots 16 are dimensioned to receive the guide 22 of each of the wedge jaw elements 20. The guide 22 will be sufficiently long to accommodate for the greatest wall thickness of body 14 at which wedge jaw element advancement is anticipated. Finally, with respect to the wedge jaw elements 20, it will be seen that the same includes a cylindrical segment, shaft-gripping interior portion 24 provided with a plurality of jaw serrations 25 such as thread segments. Each of the wedge jaw elements also includes a tapered exterior 26 which cooperates with the progressively-constricting interior 17 of body 14. Thus, as the jaw elements are advanced downwardly into the body 14, they will be urged together through the wedge action between body 14 and the elements 20, with their interior, shaft-gripping portions 24 being advanced mutually together to grip a shaft, for example, of any sized diameter.

FIGURE 2 illustrates an assembly drawing of the device. If we assume that a bulkhead 28 is provided and includes an aperture 29, and that there proceeds therethrough a shaft 30 in the direction shown by the arrow at 31, then the longitudinal placement of the shaft 30 relative to bulkhead 28 may be determined, by a user advancing over the end of the shaft the device of the present invention in assembled form. In particular, the device illustrates the body 14 with the sleeve 18 being slipped thereover and abutting annular stop shoulder 15. The several wedge jaw elements 20 are next inserted in position to grip the shaft 30. This gripping action is accomplished by the downward threading of nut 10 upon the threads 13 of body 14. This results by virtue of the fact that the nut engages the individual feet 23 of the wedge jaw elements 20, this to urge the feet of the three wedge jaw elements simultaneously in the direction of the bulkhead 28. It will be noted that the guides 22 of each of the wedge jaw elements pass along guide slots 16 as the jaw elements are advanced in a direction toward that end of body 14 including annular stop shoulder 15. Hence, it will be seen that as the nut is tightened down, the wedge jaw elements 20 are wedged together within body 14 to grip shaft 30.

When it is desired to release the gripping of the device of the present invention from shaft 30, then the nut is simply backed-off in a direction to the top of FIGURE 2 and the sleeve 15 is urged upwardly against the feet 23 of the wedge jaw elements 20 to advance these upwardly as well. This serves as a quick release for the wedge jaw elements, lifting these out of their previous seating to a loose position thereabove. Subsequently the device can be easily removed from the shaft by backing the same off, i.e., upwardly with reference to FIGURE 2.

The structure of FIGURES 3 and 4 operate in substantially the same manner as that shown in FIGURES 1 and 2. In particular, a body 32 is supplied and includes, again, a progressively-constricting interior 33 and a threaded exterior 34. Plural, longitudinally-oriented, wall guide slots 35 are also included, but this time these include an inwardly-directed slot shoulder 36.

Wedgingly cooperating with body 32 are a plurality of wedge jaw elements 37 each of these including a shaft-gripping portion 38 having serrations such as threads 39. Guides 40 and feet 41 are provided each of the wedge jaw elements 37. This time, however, an end slot 42 is provided in the individual feet 40. This is for the accommodation of release ring 43. The latter is shown in FIGURE 3 and includes a plurality of expansion notches 44 which are used for assembly and disassembly purposes. Nut 45 again includes the hexagonal exterior 46 and also a plurality of interior threads 47. The device of FIGURE 3 is shown in its assembled form in FIGURE 4.

In assembly the shoulder 48, defining the junction between guide 40 and foot 41, slides upwardly and downwardly along the slot shoulder 36 in the lower part of FIGURE 3. Each of the feet 41 of the several wedge jaw elements 20 are contained within and proceed upwardly through and extend beyond the individual wall guide slots 35 of the body 32. See FIGURE 4 in this regard.

It is seen that the slots 42 seat the release ring 43. As the several wedge jaw elements are advanced upwardly with respect to body 32 in FIGURE 3 (i.e., toward the most open end of body 32), then the notches 44 are advanced to be in line with the feet 41 so that additional relief is given to the outward expansion of the several wedge jaw elements 37. This facilitates the disassembly of the device and, subsequently, the reassembly thereof. Such a feature likewise reduces the slot depth and foot size of the individual wedge jaw elements, the size of the ring, and so forth.

The device in its assembled form in FIGURE 4 will be placed over the shaft 30 in a manner similar to that shown with respect to the other device of the invention in FIGURE 2. The device is then urged downwardly toward the existing bulkhead 28 or other means and the nut tightened down upon threads 34 of body 32 to advance the jaw elements downwardly to grip the shaft so included. Once there is a tightening down of the clamp nut on the shaft, then the shaft's longitudinal position is fixedly determined with respect to any bulkhead or other reference plane that may be present. When it is desired to loosen the device, then the nut 56 is backed off and the user urges the release ring 43 upwardly to carry the jaw elements in a release-engagement direction. This, thus, releases the jaw elements without disturbing their relative mutual spacing. At this time the device may be removed from the shaft involved and stored for subsequent use.

What is hence provided is a device usable for gripping "shafts," i.e. shafts, studs, and other devices and for predetermining their location with respect to a reference plane such as a bulkhead surface. The term "shaft" as used herein includes any elongate member such as regular shafts, studs, or other rigid or flexible elongate members, of whatever cross-section.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A gripping device including, in combination, an annular body having a threaded exterior and a progressively-constricting interior forming a tapered socket and having an axial bore, said body being provided with mutually-spaced, longitudinal wall slots, plural wedge jaw elements disposed within said body and having guides proceeding through said wall slots and terminating in respective feet, said wedge jaw elements having interior serrated edges and tapered exterior surfaces tapered to co-operate with and complement said interior taper, ring means annularly disposed about said body and disposed in engageable contact with said feet of said wedge jaw elements to release the latter, nut means threaded onto said body toward said feet of said wedge jaw means and said feet are provided with end slots with said ring means engaging said end slots whereby movement of said nut means against said feet causes the jaw elements to move radially and longitudinally inward to grip an element disposed therebetween.

2. Structure according to claim 1 wherein said ring means is provided with interior relief notches disposed in communication with the interior periphery of said ring means, said notches being dimensioned for receiving said feet of said wedge jaw elements upon mutual expansion of the latter.

References Cited

UNITED STATES PATENTS

| | | | |
|---|---|---|---|
| 68,537 | 9/1867 | Smith | 279—64 |
| 1,087,327 | 2/1914 | Sessions | 279—64 |
| 1,568,869 | 1/1926 | Boes | 279—64 |
| 1,606,972 | 11/1926 | Nielsen | 279—64 |
| 2,935,299 | 5/1960 | Jansen | 287—20.3 |
| 3,049,368 | 8/1962 | Jansen | 287—20.3 |
| 3,117,485 | 1/1964 | Jansen | 287—20.3 |

FOREIGN PATENTS 459,924  10/1950  Italy.

CARL W. TOMLIN, *Primary Examiner.*

W. L. SHEDD, *Assistant Examiner.*